(12) United States Patent
Narayanan

(10) Patent No.: US 8,358,844 B2
(45) Date of Patent: Jan. 22, 2013

(54) SYSTEM, METHOD, AND COMPUTER PROGRAM PRODUCT FOR DETERMINING WHETHER TEXT WITHIN AN IMAGE INCLUDES UNWANTED DATA, UTILIZING A MATRIX

(75) Inventor: Udhayakumar Lakshmi Narayanan, Thirubuyanam (IN)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/447,845

(22) Filed: Apr. 16, 2012

(65) Prior Publication Data

US 2012/0201458 A1 Aug. 9, 2012

Related U.S. Application Data

(63) Continuation of application No. 12/102,566, filed on Apr. 14, 2008, now Pat. No. 8,180,152.

(51) Int. Cl.
*G06K 9/34* (2006.01)
(52) U.S. Cl. ............... 382/176; 382/186; 382/267
(58) Field of Classification Search ............ 382/176, 382/186, 261, 267; 358/3.06, 1.9, 447, 462; 340/12.25, 5.61; 709/201, 206, 204; 706/20; 707/999; 250/221, 208.1
See application file for complete search history.

(56) References Cited

U.S. PATENT DOCUMENTS

| | | | |
|---|---|---|---|
| 5,182,778 A | 1/1993 | Rudak et al. ............... 382/267 |
| 5,949,964 A | 9/1999 | Clouthier et al. ............ 358/3.06 |
| 5,987,221 A | 11/1999 | Bearss et al. ................ 358/1.9 |
| 5,987,610 A | 11/1999 | Franczek et al. |
| 6,073,142 A | 6/2000 | Geiger et al. |
| 6,460,050 B1 | 10/2002 | Pace et al. |
| 6,731,407 B1 * | 5/2004 | Hayama ..................... 358/3.2 |
| 6,769,016 B2 | 7/2004 | Rothwell et al. ............. 709/206 |
| 7,506,155 B1 | 3/2009 | Stewart et al. |
| 7,546,334 B2 | 6/2009 | Redlich et al. .............. 709/201 |
| 7,930,353 B2 | 4/2011 | Chickering et al. |
| 8,180,152 B1 | 5/2012 | Narayanan |
| 2005/0060295 A1 | 3/2005 | Gould et al. ................ 709/250 |
| 2005/0216564 A1 | 9/2005 | Myers et al. ............... 358/462 |

OTHER PUBLICATIONS

USPTO Jul. 3, 2012 Response to May 3, 2012 Nonfinal Office Action from U.S. Appl. No. 11/297,628.
USPTO Oct. 3, 2012 Final Office Action from U.S. Appl. No. 11/297,628.
Artificial Intelligence @ Bristol, The Artificial Intelligence Group, http://www.enm.bris.ac.uk/ai/index.html, printed Dec. 7, 2005.
Brian Ripley's Home Page, http://www.stats.ox.ac.uk/~ripley/, printed Dec. 7, 2005.
Computer Vision & Robotics, University of Cambridge Department of Engineering, http://mi.eng.cam.ac.uk/research/vision/research.html, printed Dec. 7, 2005.
Dr. Evor Hines-Research Interests, http://www2.warwick.ac.uk/fac/sci/eng/staff/elh/research/, printed Dec. 7, 2005.
Frederic, "Text Mining Applied to SPAM Detection," University of Geneva, Jan. 24, 2007.
Fumera et al., "Spam Filtering Based on the Analysis of Text Information Embedded Into Images," Journal of Machine Learning Research 7, pp. 2699-2720, 2006.

(Continued)

*Primary Examiner* — Anh Hong Do
(74) *Attorney, Agent, or Firm* — Patent Capital Group

(57) ABSTRACT

A system, method, and computer program product are provided for determining whether text within an image includes unwanted data, utilizing a matrix. In operation, a matrix corresponding to an image is generated. Additionally, text within the image is identified utilizing the matrix. Furthermore, it is determined whether the text includes unwanted data.

22 Claims, 6 Drawing Sheets

OTHER PUBLICATIONS

Garretson, "SonicWall targets image-based spam with upgraded e-mail security offerings," Network World, Sep. 18, 2006.
U.S. Appl. No. 11/297,628, filed Dec. 7, 2005.
USPTO Nov. 26, 2007 Response to Aug. 24, 2007 Nonfinal Office Action from U.S. Appl. No. 11/297,628.
USPTO Aug. 24, 2007 Nonfinal Office Action from U.S. Appl. No. 11/297,628.
USPTO Dec. 10, 2008 Examiner's Answer from U.S. Appl. No. 11/297,628.
USPTO Jan. 31, 2008 Final Office Action from U.S. Appl. No. 11/297,628.
USPTO Sep. 22, 2008 Appeal Brief from U.S. Appl. No. 11/297,628.
USPTO Feb. 10, 2009 Reply Brief from U.S. Appl. No. 11/297,628.
USPTO Mar. 17, 2009 Examiner's Answer from U.S. Appl. No. 11/297,628.
USPTO May 15, 2009 Reply Brief from U.S. Appl. No. 11/297,628.
USPTO Feb. 13, 2012 BPAI Decision from U.S. Appl. No. 11/297,628.
USPTO Apr. 11, 2012 RCE Response to BPAI Decision from U.S. Appl. No. 11/297,628.
Vision Research, MIT CSAIL Projects, http://groups.csail.mit.edu/vision/projects/index.php, printed Dec. 7, 2005.
USPTO May 3, 2012 Nonfinal Office Action from U.S. Appl. No. 11/297,628.

* cited by examiner

FIGURE 6

Penny Stocks Alert Advisory Service
HLVC IS A HOT STOCK!

Get on HLVC First Thing on Friday, it's going to expload!    602
Company: HLV Trading, Inc
Symbol: HLVC
Current Price: $0.02

The price is the minimum for last week and it will boom on FRIDAY!
Worst Scenario Target Price: $0.09
Most Probable Scenario Target Price: $0.10
Best Scenario Target Price: $0.30

CHECK LAST FRIDAY GROWTH. IT WILL GROW THIS FRIDAY AGAIN!

Recommendation: "STRONG BUY" starting on FRIDAY, AUGUST 4, 2006.

Here is a brand new entry into the Red Hot energy sector. Less than one    604
month after their entry was made public, hLVc makes as acquisition
announcement which sends their stock price flying up by over 300cencentric.net!!

About the Company
HLV Trading, Inc. an equity trading company has now embarked on a focus of responsible development exploration, and exploitation of oil and gas resources in North America. HLVC is an emerging junior oil and gas company financially well connected, coupled with a strong management and technical team focused on exploiting oil and gas reserves in North America.

Members should pick up HLVC as early as possible on Friday. This news is going to send HLVC off the charts. We all know that in the oil business it's the big announcements that makes these stocks explode!!!

We see this as a huge profit taking a DEAL.

WATCH THIS ONE TRADE ON THE 4 OF AUGUST. GO HLVC!

SYSTEM, METHOD, AND COMPUTER PROGRAM PRODUCT FOR DETERMINING WHETHER TEXT WITHIN AN IMAGE INCLUDES UNWANTED DATA, UTILIZING A MATRIX

RELATED APPLICATION

This Application is a continuation (and claims the benefit of priority under 35 U.S.C. §120) of U.S. application Ser. No. 12/102,566, filed Apr. 14, 2008 now U.S. Pat. No. 8,180,152, entitled "SYSTEM, METHOD, AND COMPUTER PROGRAM PRODUCT FOR DETERMINING WHETHER TEXT WITHIN AN IMAGE INCLUDES UNWANTED DATA, UTILIZING A MATRIX," Inventor Udhayakumar Lakshmi Narayanan. The disclosure of the prior application is considered part of (and is incorporated by reference in) the disclosure of this application.

FIELD OF THE INVENTION

The present invention relates to computer systems, and more particularly to the receipt of unwanted data in electronic messaging.

BACKGROUND

Spamming is the abuse of electronic messaging systems to indiscriminately send unsolicited bulk messages. While the most widely recognized form of spam is e-mail spam, the term is applied to similar abuses in other media. For example, spamming and the sending of unwanted data may occur in the context of instant messaging, Web search engines, mobile phone messaging, Internet forums, and junk fax transmissions, etc.

E-mail spam, also known as unsolicited bulk e-mail (UBE) or unsolicited commercial e-mail (UCE), is the practice of sending unwanted e-mail messages, frequently with commercial content, in large quantities to an indiscriminate set of recipients. Instant Messaging spam uses instant messaging systems to send unwanted messages to an indiscriminate set of recipients. Mobile phone spam is directed at text messaging services of mobile phones.

Often, electronic messaging systems employ spam filters and other content blocking filters to alleviate incoming spam messages and unwanted content. However, electronic messages that contain text embedded in images most often escape through spam and other content blocking filters. Furthermore, the percentage of spam messages is constantly increasing. There is thus a need for overcoming these and/or other issues associated with the prior art.

SUMMARY

A system, method, and computer program product are provided for determining whether text within an image includes unwanted data, utilizing a matrix. In operation, a matrix corresponding to an image is generated. Additionally, text within the image is identified utilizing the matrix. Furthermore, it is determined whether the text includes unwanted data.

BRIEF DESCRIPTION OF THE DRAWINGS

FIG. 6 shows an image including text, in accordance with another embodiment.

DETAILED DESCRIPTION

Figure 1:
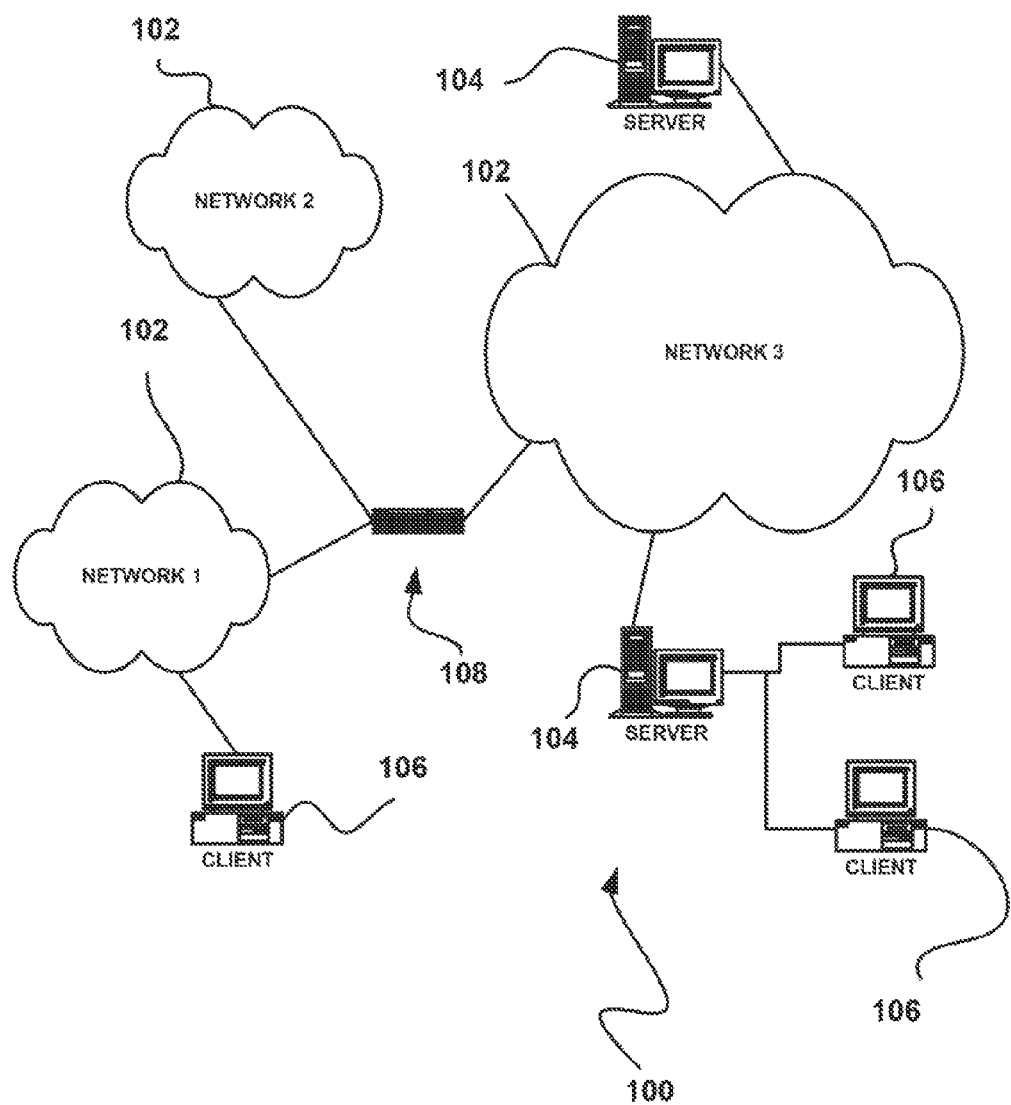
FIG. 1 illustrates a network architecture, in accordance with one embodiment.

FIG. 1 illustrates a network architecture 100, in accordance with one embodiment. As shown, a plurality of networks 102 is provided, hi the context of the present network architecture 100, the networks 102 may each take any form including, but not limited to a local area network (LAM, a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
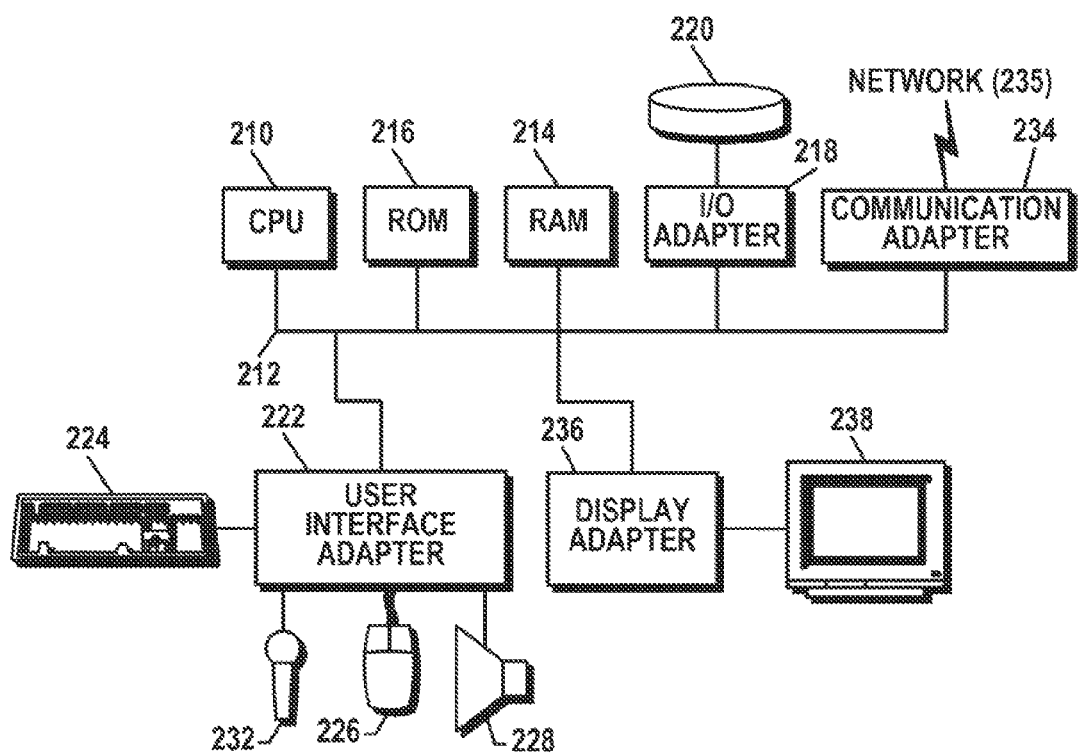
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
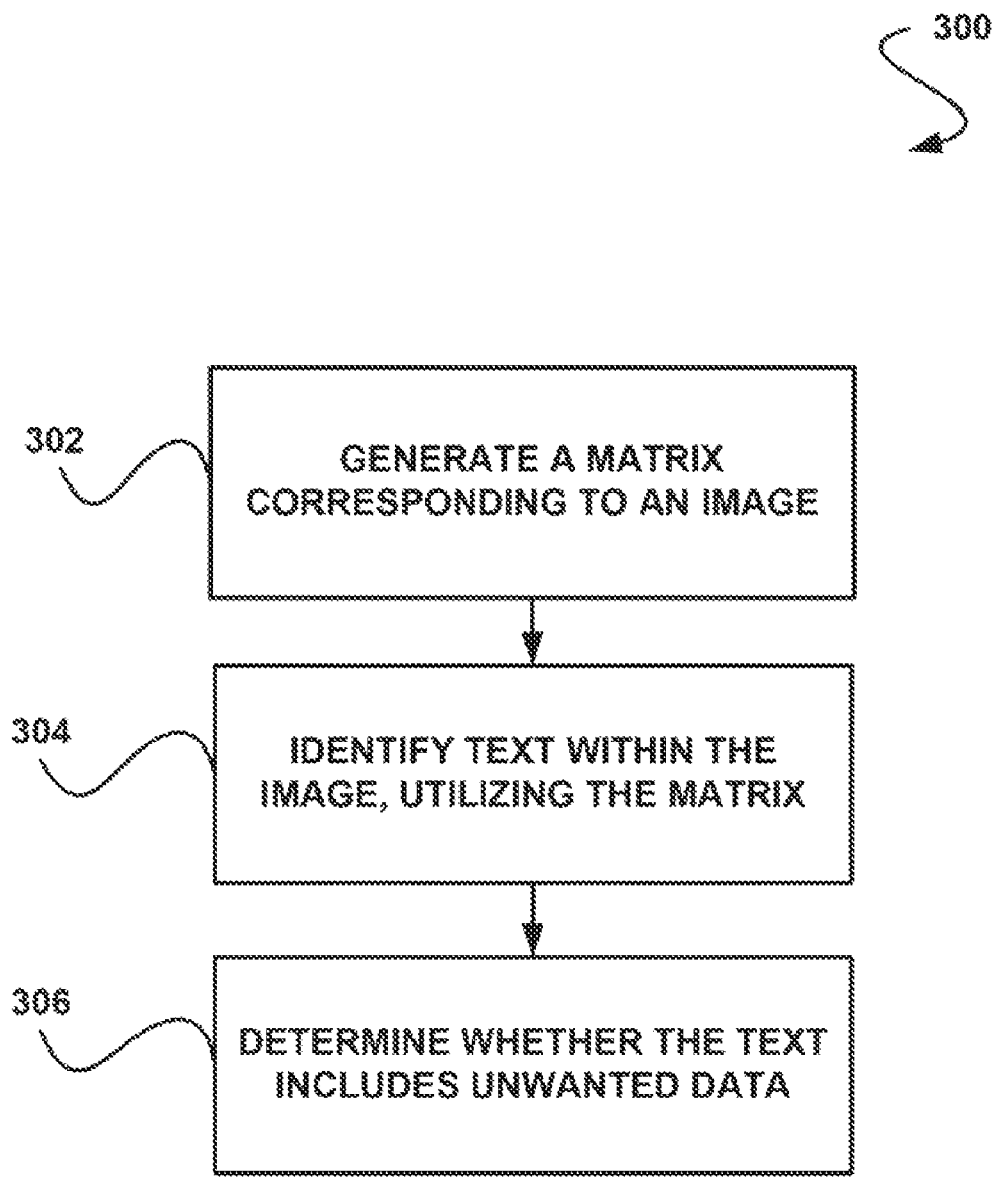
FIG. 3 shows a method for determining whether text within an image includes unwanted data, utilizing a matrix, in accordance with one embodiment.

FIG. 3 shows a method 300 for determining whether text within an image includes unwanted data, utilizing a matrix, in accordance with one embodiment. As an option, the method 300 may be implemented in the context of the architecture and environment of FIGS. 1 and/or 2. Of course, however, the method 300 may be carried out in any desired environment.

As shown, a matrix corresponding to an image is generated. See operation 302. In this case, the image may include any type of image. For example, in various embodiments, the image may include, but is not limited to, a bitmap image, a drawing file, an encapsulated postscript, a graphical interchange format file, a PEG image file, a picture file, a portable document format file, a Photoshop document, a tagged image file format, and/or any other image that meets the above definition.

As shown further, text within the image is identified utilizing the matrix. See operation 304. In this case, the text may include any character, series of characters, number, and/or series of numbers. Additionally, in various embodiments, the text may include product information, service information, organizational information, stock information, and/or any other information.

Furthermore, it is determined whether the text includes unwanted data. See operation 306. In the context of the present description, unwanted data refers to any undesirable data. For example, the unwanted data may include an unsolicited electronic message. In this case, the unsolicited electronic message may include an unsolicited advertisement, unsolicited product or service information, and/or any other unsolicited electronic message.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
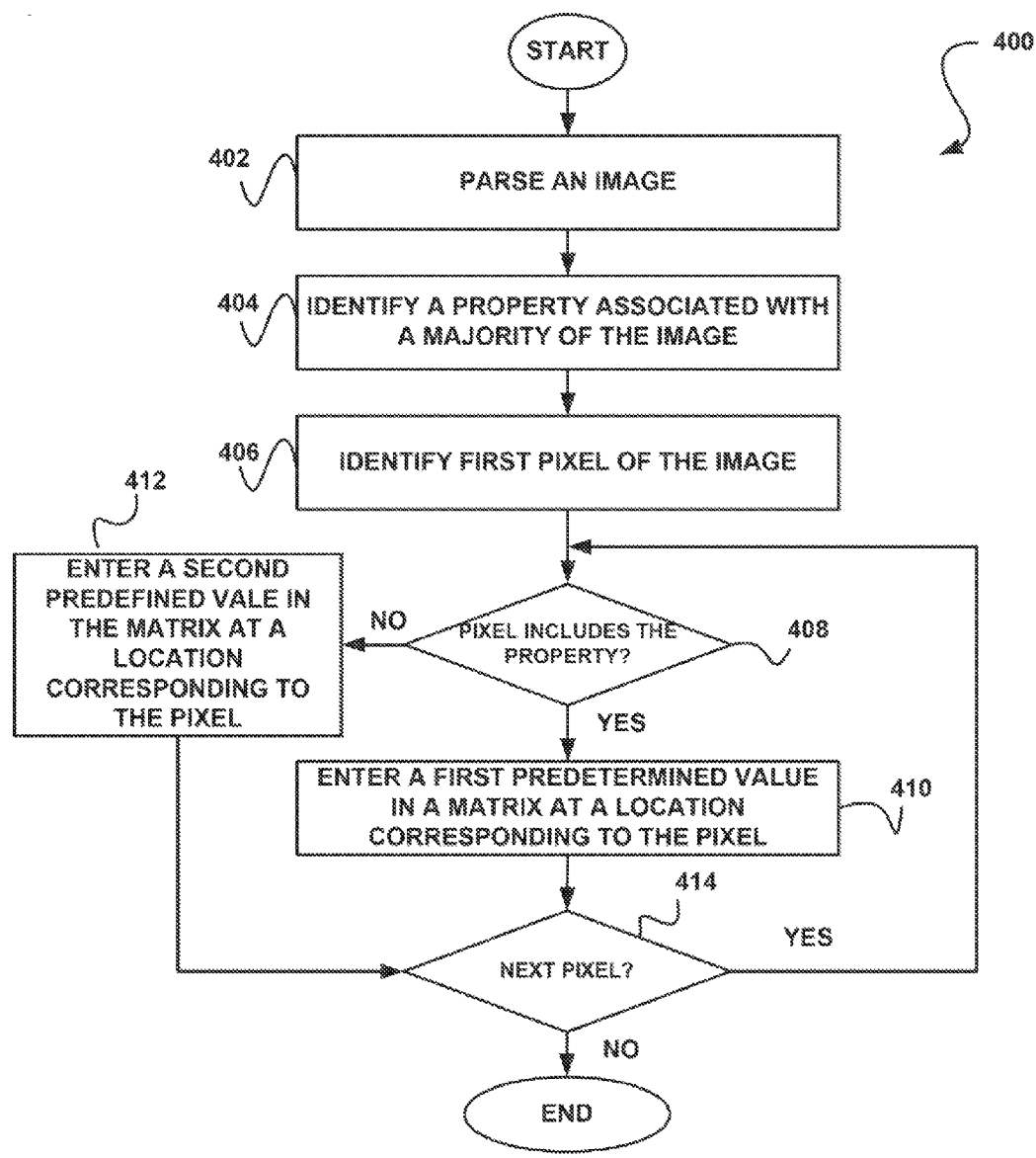
FIG. 4 shows a method for determining whether text within an image includes unwanted data, utilizing a matrix, in accordance with another embodiment.

FIG. 4 shows a method 400 for determining whether text within an image includes unwanted data, utilizing a matrix, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown, an image is parsed. See operation 402. In one embodiment, the image may be an image received from an electronic communication. For example, the image may be received from an e-mail, text message, instant message, or any other type of electronic communication.

Additionally, the parsing may include incrementing through the image on a pixel by pixel basis. As an option, the parsing may include a scan (e.g. a left to right scan, etc.) across a row of pixels. As another option, the parsing may include a scan (e.g. a top to bottom scan, etc.) on a column of pixels.

Furthermore, a property associated with a majority of image is identified. See operation 404. In the context of the present description, a property refers to any characteristic associated with an image. For example, in various embodiments, the property may include data corresponding to a pixel (e.g. similar data, etc.), a pixel color (e.g. similar colors), background characteristics (e.g. similar background properties, etc.), and/or any other property.

In one embodiment, the property may be a background property which is clearly distinct from text. In this case, the background property may be a property corresponding to a background which is stored and considered the background of the image. In some cases, the background may include double shades, dual lines, etc.

Once a property associated with a majority of the image is identified, a first pixel of the image is identified. See operation 406. It is then determined whether that pixel includes the property associated with the majority of the image. See operation 408.

For example, the pixel may be evaluated to determine if there is any deviation in that pixel property from the property associated with the majority of the image. In some cases, when a deviation is present, it may be determined that the pixel corresponds to text in the image. Furthermore, when a deviation is present, it may be determined that the pixel corresponds to a character associated with text in the image.

If it is determined that the pixel includes the property associated with the majority of the image, a first predetermined value is entered into a matrix at a location corresponding to that pixel. See operation 410. In this case, the first predetermined value may be any predetermined value. For example, in one embodiment, the predetermined value may be a zero.

If it is determined that the pixel does not include the property associated with the majority of the image, a second predetermined value is entered into the matrix at a location corresponding to that pixel. See operation 412. The second predetermined value may be any predetermined value. For example, in one embodiment, the predetermined value may be an integer different from the first predetermined value (e.g. a one, etc.).

Once the predetermined values are entered into the matrix, it is determined whether there is another pixel. See operation 414. If it is determined that there is another pixel, it is determined whether that pixel includes the property associated with the majority of the image.

In this way, the matrix may be generated by parsing the image. Furthermore, each of a plurality of pixels of the image may be parsed. Once parsed, the matrix may be generated by determining whether each of the plurality of pixels of the image represents a character or a background.

In one embodiment, the matrix may be generated by assigning a value to each of the plurality of pixels of the image, based on whether each of the plurality of pixels of the image represents the character or the background. The matrix may then be utilized to identify text within the image.

It should be noted that a dimension of the matrix may be a function of a resolution of the image. For example, the matrix may have the same number of rows as the number of lines of the image. Additionally, the matrix may have the same number of columns as the number of lines of the image.

Figure 5:
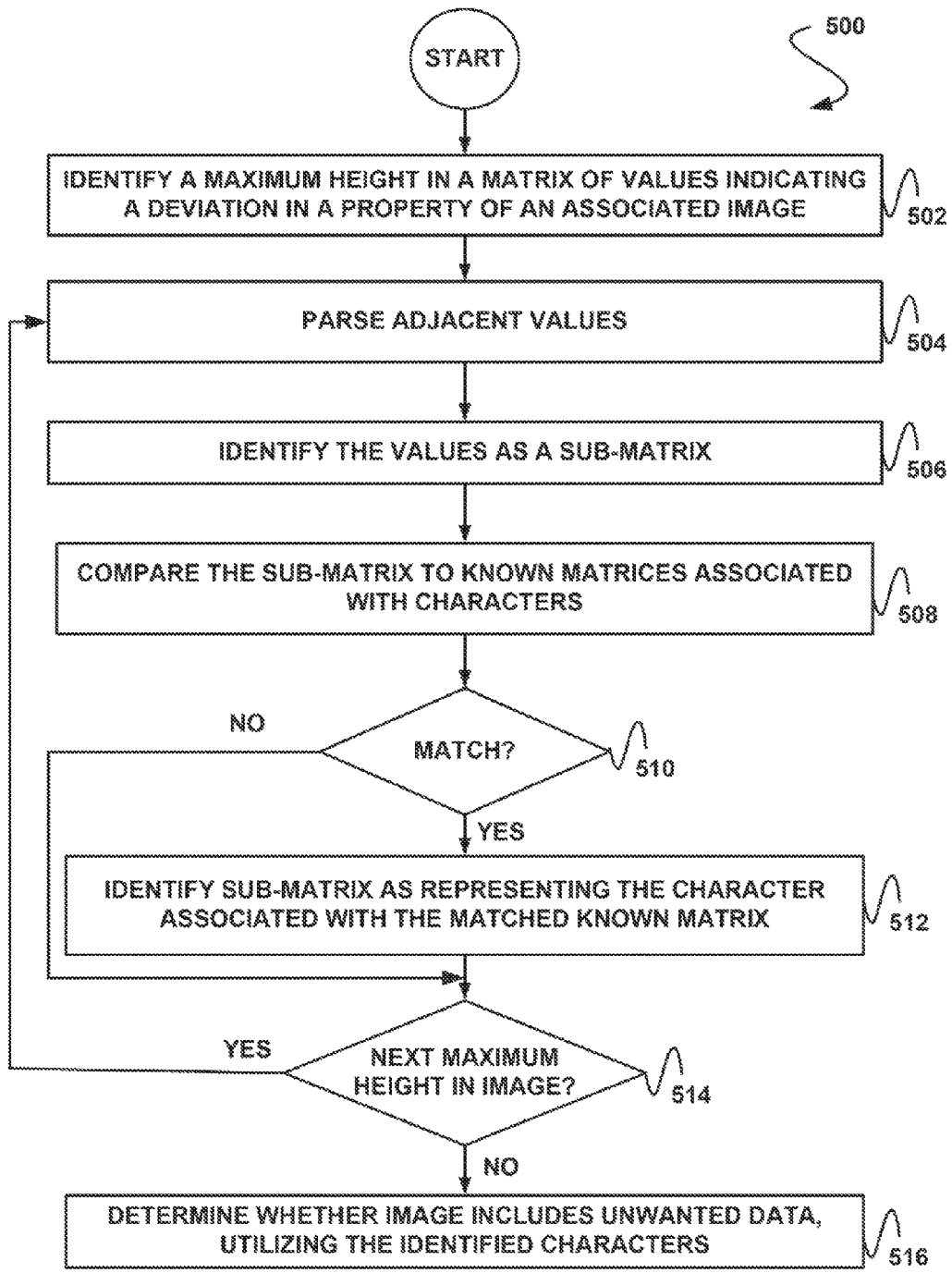
FIG. 5 shows a method for determining whether text within an image includes unwanted data, utilizing a matrix, in accordance with another embodiment.

FIG. 5 shows a method 500 for determining whether text within an image includes unwanted data, utilizing a matrix, in accordance with another embodiment. As an option, the method 500 may be implemented in the context of the architecture and environment of FIGS. 1-4. Of course, however, the method 500 may be carried out in any desired environment. Again, the aforementioned definitions may apply during the present description.

As shown, a maximum height in a matrix of values is determined. See operation 502. In this case, the values in the matrix indicate a deviation in a property of a plurality of pixels in an associated image from a property associated with the majority of the image.

For example, pixels including similar properties corresponding to a majority of the image may be identified in the matrix with a first predetermined value. Similarly, pixels including properties deviating from properties corresponding to a majority of the image may be identified in the matrix with a second predetermined value. In one embodiment, pixels with a property similar to a property of the majority of the image may be identified in the matrix with a value of "0." In the case, pixels with a property that deviate from a property of the majority of the image may be identified in the matrix with a value of "1."

As an option, the maximum height in the matrix, or the maximum range of contiguous distinct lines, may be identified from top to bottom. For example, from a first point of an entry of "1" indicating a property deviation, the deviation may be tracked from top to bottom until the series of 1's end. In this way, a range for a length of text may be determined. This range may be logged as a baseline for the length of a word.

Once the maximum height of values in the matrix is identified, adjacent values in the matrix are parsed. See operation 504. For example, once the range of 1's is identified, the 1's may be parsed starting from the left most entry within the range, irrespective of which line is the left most entry.

In this way it may be ensured that the parsing starts at the beginning of a character. While tracing the 1's in the matrix, vales of 1 on all adjacent entries may be identified (e.g. up, down, left to right, diagonal up/down, etc.). The contiguous 1's within the height baseline may be followed until the contiguous sequence of 1's stop These values may then be identified as a sub-matrix. See operation 506. In one embodiment, the number of sub-matrices may correspond to the number of letters in the image.

The sub-matrix is then compared to known matrices associated with characters. See operation 508. As an option, the known matrices may be included in a dictionary for an alphabet. For example, the dictionary may include lower and upper case characters, as well as numerals in the form of matrices.

In one embodiment, the dictionary may include a dictionary of matrices corresponding to the dimensions of the matrix. This may include identifying a dimension of a resultant matrix for each character after parsing and resizing the dictionary matrices accordingly to facilitate comparison. For example, if a scanned matrix for a character is of dimension n×m, the dictionary matrices may be resized accordingly.

Furthermore, each matrix may be compared with matrices in the dictionary and the corresponding matched character may be returned. In this case, characters may be sequenced considering the end of a line. Once the sub-matrix is compared to the known matrices, it is then determined whether there is a match. See operation 510. In one embodiment, the determination may include considering a difference between the compared matrices.

For example, if the difference between the sub-matrix and the known matrix is within a specified threshold, the sub-matrix and the known matrix may be determined to match. On the other hand, if the difference between the sub-matrix and the known matrix is not within a specified threshold, the sub-matrix and the known matrix may be determined to be different. As an option, this threshold may be configurable.

If there is a match, the sub-matrix is identified as representing the character associated with the matched known matrix. See operation 512. It is then determined whether there is another maximum height of values to be determined in the image. See operation 514.

If there is another maximum height of values to be determined, the height is determined and adjacent values in the matrix are again parsed. If there is not another maximum height of values to be determined, it is determined whether the image includes unwanted data; utilizing the identified characters. See operation 516.

In this way, text included in an image may be identified by identifying a maximum height for each of a plurality of lines of characters. For example, the text may be identified by parsing the matrix, where the matrix includes a plurality of values each corresponding to at least one of a plurality of pixels of the image and indicate whether the pixels of the image represents a character or a background. Thus, the matrix may be parsed by identifying contiguous values that indicate that the pixels of the image represent the character.

The text may then be identified by comparing the contiguous values with predefined patterns representative of the text. Once the text is identified, the text may be determined to include unwanted data, based on a comparison of the text with predefined text known to be unwanted. In this way, unwanted data may be filtered such that a user does not necessarily view the unwanted data.

In one embodiment, there may be a reaction if it is determined that the text includes the unwanted data. For example, the reacting may include at least one of deleting, quarantining, categorizing, and/or reporting the unwanted data. As an option, the reaction may include prompting a user to choose a reaction. For example, an interface may be used to prompt a user to delete, quarantine, categorize, and/or report the unwanted data. As another option, the reacting may include an automatic reaction.

FIG. 6 shows an image 600 including text 602, in accordance with another embodiment. As an option, the image 600 may be viewed in the context of the architecture and environment of FIGS. 1-5. Of course, however, the image 600 may be viewed in the context of any desired environment. Furthermore, the aforementioned definitions may apply during the present description.

As shown, the text 602 of the image 600 includes a plurality of characters. In operation, the image 600 may be received by a system in an electronic communication. For example, the image 600 may be received in an e-mail or text message.

In this case, the electronic communication may be received using any device capable of receiving an electronic communication. For example, in various embodiments the device may include a desktop computer, a notebook computer, a handheld computer, a PDA, a mobile phone, and/or any other device capable of receiving an electronic communication.

Once the image 600 is received, a matrix corresponding to the image 600 may be generated by parsing the image 600, as shown in the parsed portion 604. Although not illustrated, the entire image 600 may be parsed. In this case, each of the pixels of the image 600 are parsed. The matrix may then be generated by determining whether each of the pixels of the image represents a character or a background.

In one embodiment, this may be accomplished by assigning a value to each of the pixels of the image 600, based on whether each of the plurality of pixels of the image represents the character or the background. These values may be any value capable of identifying the pixel as corresponding to a background or character. The text 602 within the image 600 may then be identified utilizing the matrix by parsing the matrix.

In this case, the matrix will include values corresponding to at least one of the pixels of the image 600 and indicate whether the pixels of the image represent a character or a background. Thus, the matrix may be parsed by identifying contiguous values that indicate that the pixels of the image 600 represent the character. For example, the text 602 may be identified by comparing the contiguous values with predefined patterns representative of the text.

Once the text 602 is identified, it is determined whether the text 602 includes unwanted data. If the text 602 includes unwanted data, the system that received the image may react accordingly. In one embodiment, the system may automatically delete the image and/or the associated electronic message. In another embodiment, a user may be prompted to delete the image and/or the associated electronic message.

In some cases, it may be determined that the image does not include unwanted data. In these cases, the system may also react. For example, the system may allow the electronic message including the image to proceed to an original destination (e.g. an inbox, etc.).

As another example, the electronic message may be directed towards a destination for screened messages. In still another embodiment, a user may be prompted to direct the screened message. Of course, however, the system may perform any number of actions upon the determination that the image includes or does not include unwanted data.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method to be performed in conjunction with a processor operating in an electronic environment, comprising:
   parsing a plurality of pixels of an image;
   identifying a property associated with a predetermined portion of the plurality of pixels;
   determining whether each pixel of the plurality of pixels includes the property;
   entering a predetermined value for each of the plurality of pixels in a matrix at a location corresponding to the pixel, wherein the predetermined value is based upon whether the pixel includes the property;
   identifying text within the image, utilizing the matrix; and
   determining whether the text includes unwanted data.

2. The method of claim 1, wherein the property is a background property of the image.

3. The method of claim 1, wherein the predetermined portion is a majority of the plurality of pixels.

4. The method of claim 1, wherein the plurality of pixels include all of the pixels of the image.

5. The method of claim 1, wherein a dimension of the matrix is a function of a resolution of the image.

6. The method of claim 1, wherein entering the predetermined value includes:
   entering a first predetermined value if the pixel includes the property; and
   entering a second predetermined value if the pixel includes does not include the property.

7. The method of claim 6, wherein the first predetermined value is representative of the pixel corresponding to a background of the image.

8. The method of claim 6, wherein the second predetermined value is representative of the pixel corresponding to a character of the image.

9. The method of claim 6, wherein identifying the text within the image includes identifying a maximum height of entries in the matrix having the second predetermined value.

10. The method of claim 6, wherein identifying the text within the image includes identifying contiguous entries in the matrix having the second predetermined value.

11. The method of claim 10, wherein the text is identified by comparing the contiguous entries with predefined patterns representative of text.

12. The method of claim 10, wherein identifying the text further includes identifying the contiguous entries as a sub-matrix.

13. The method of claim 12, wherein identifying the text further includes comparing the sub-matrix to at least one predefined matrix associated with text.

14. The method of claim 1, wherein the text is determined to include unwanted data, based on a comparison of the text with predefined text known to be unwanted.

15. The method of claim 1, wherein the image is received from an electronic message.

16. The method of claim 1, wherein the unwanted data includes an unsolicited electronic message.

17. The method of claim 16, wherein the unsolicited electronic message includes an advertisement.

18. The method of claim 1, further comprising reacting if it is determined that the text includes the unwanted data.

19. The method of claim 18, wherein the reacting includes at least one of deleting, quarantining, categorizing, and reporting the unwanted data.

20. A computer program product embodied on a non-transitory medium for performing operations, comprising:
   parsing a plurality of pixels of an image;
   identifying a property associated with a predetermined portion of the plurality of pixels;
   determining whether each pixel of the plurality of pixels includes the property;
   entering a first predetermined value for each of the plurality of pixels in a matrix at a location corresponding to the pixel if the pixel includes the property;
   entering a second predetermined value for each of the plurality of pixels in the matrix at a location corresponding to the pixel if the pixel includes does not include the property;
   identifying text within the image, utilizing the matrix; and
   determining whether the text includes unwanted data.

21. A system, comprising:
   a processor configured for performing the operations of:
      parsing a plurality of pixels of an image;
      identifying a property associated with a predetermined portion of the plurality of pixels;
      determining whether each pixel of the plurality of pixels includes the property;
      entering a first predetermined value for each of the plurality of pixels in a matrix at a location corresponding to the pixel if the pixel includes the property;
      entering a second predetermined value for each of the plurality of pixels in the matrix at a location corresponding to the pixel if the pixel includes does not include the property;
      identifying text within the image, utilizing the matrix; and
      determining whether the text includes unwanted data.

22. The system of claim 21, wherein the processor is coupled to memory via a bus.

* * * * *